United States Patent Office 3,256,269

Patented June 14, 1966

1

3,256,269

MIXED ANHYDRIDES OF NAPHTHYLAZO-PHENYL

Phylis T. Moore, Lexington, Mass., assignor to Polaroid Corporation, Cambridge, Mass., a corporation of Delaware No Drawing. Filed Mar. 4, 1963, Ser. No. 262,356

12 Claims. (Cl. 260—202)

This invention relates to novel chemical compounds and, more particularly, to a novel class of azo dyes which are particularly useful as intermediates in the preparation of other novel compounds.

One object of this invention, therefore, is to provide a novel class of compounds.

Another object of this invention is to provide a novel class of chemical intermediates which are useful in the preparation of a novel class of compounds which have particular utility in the field of color photography.

Yet another object is to provide a novel class of azo dyes.

Still another object is to provide novel processes for preparing the compounds of this invention.

These and other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

Generally speaking, the novel compounds of this invention may be defined as azonaphthol dyes having a substituent of the formula:

(A)
$$—O—\text{lower alkylene}—\overset{O}{\overset{\|}{C}}—O—\overset{O}{\overset{\|}{C}}—O—\text{alkyl}$$

bonded directly to a nuclear carbon atom of the naphthalene nucleus in a position para to a hydroxy substituent, e.g., in the 4 position of a 1-naphthol nucleus.

The preferred compounds of this invention may be defined as azonaphthol dyes of the formula:

(B)

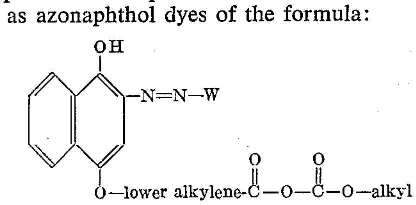

wherein W is the radical of a diazotizable amine, W—$NH_2$, preferably an amine of the benzene or naphthalene series; and nuclear substituted derivatives thereof, e.g., derivatives where one or more hydrogen atoms of the naphthalene nucleus are replaced by various constituents which may alter the chemical and/or physical characteristics of the dye. Such substituents, e.g., alkyl, alkoxy, chloro, etc., are well known in the dye art and per se comprise no part of the present invention.

As examples of suitable alkylene radicals, mention may be made of methylene, ethylene, ethylidene, propylene, isopropylene, etc.

The alkyl moiety in the formulae is preferably also a lower alkyl radical such as methyl, ethyl, isopropyl, isobutyl, etc.

2

As examples of the diazotizable amines, W—$NH_2$, which may be employed to provide the substituent —N═N—W of Formula B, mention may be made of the following compounds:

1)

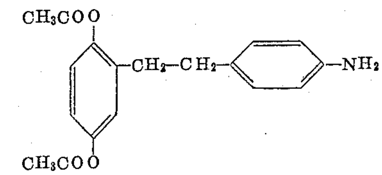

p-(β-2,5-diacetoxyphenethyl) aniline (2)

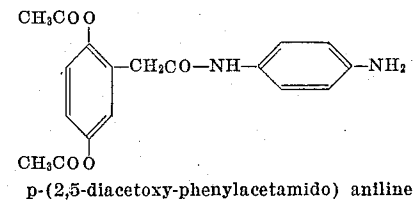

p-(2,5-diacetoxy-phenylacetamido) aniline (3)

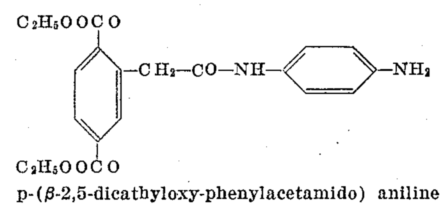

p-(β-2,5-dicathyloxy-phenylacetamido) aniline (4)

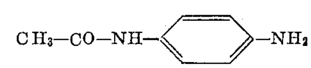

p-acetamidoaniline (5)

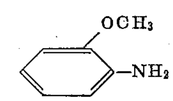

o-anisidine (6)

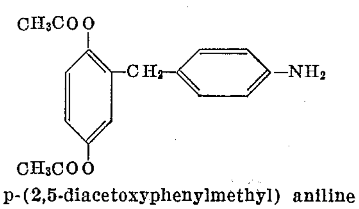

p-(2,5-diacetoxyphenylmethyl) aniline (7)

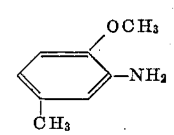

2-methoxy-5-methyl aniline

The novel compounds of Formula A may be prepared by reacting an azonaphthol dye having bonded directly to a nuclear carbon atom of the naphthalene nucleus in a position para to a hydroxy substitute a substituent of the formula:

(C)
$$—O—\text{lower alkylene}—\overset{O}{\overset{\|}{C}}—OH$$

with a tertiary amine, e.g., trimethylamine, triethylamine, tripropylamine, tributylamine, methylpiperidine, ethylpiperidine, dimethylaniline, etc. (trialkylamines such as triethylamine being preferred), to form the ammonium salt thereof; and thereafter reacting this ammonium salt with an alkyl chlorocarbonate, e.g., methyl, ethyl, isopropyl, isobutyl chlorocarbonate, etc. to form the mixed anhydride of Formula A or B.

The preferred compounds of Formula B may be prepared in the same manner by reacting a compound of the formula:

(D)

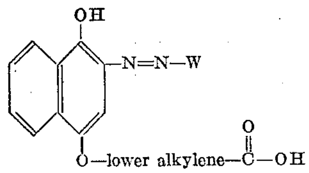

with a tertiary amine to form the ammonium salt thereof; and thereafter reacting this ammonium salt with an alkyl chlorocarbonate.

In order to prevent disproportionation of the mixed anhydride, it is necessary to perform the reaction between the ammonium salt and the alkyl chlorocarbonate at a reduced temperature at which disproportionation is precluded, e.g., at or below 0° C., preferably at −5° C., and in an inert solvent which will not freeze at the particular temperature employed. As used herein, the term "inert solvent" means a solvent or mixture of solvents which is chemically inert to or unreactive with the reactants or the reaction product. As examples of such solvents, mention may be made of acetone, carbon tetrachloride, toluene, anisole, etc.

The azonaphthol dye starting materials for Formulae C and D may be prepared by coupling a diazonium salt with a naphthol having a substituent of Formula C, according to the procedure described and claimed in copending application Serial No. 262,357, filed concurrently herewith.

As examples of useful naphthol compounds described and claimed in the aforementioned copending application, mention may be made of the following novel compounds:

(8)

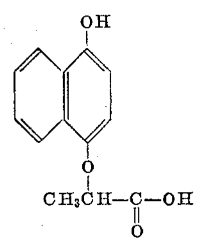

α-(4-hydroxy)-1-naphthoxypropionic acid (9)

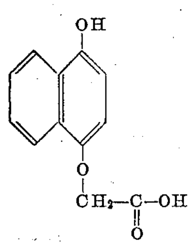

4-hydroxy-1-naphthoxyethanoic acid (10)

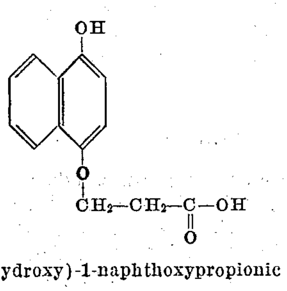

β-(4-hydroxy)-1-naphthoxypropionic acid (11)

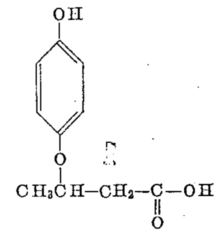

β-(4-hydroxy)-1-naphthoxybutyric acid (12)

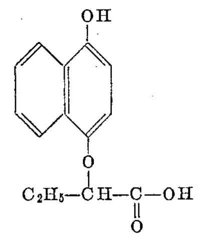

α-(4-hydroxy)-1-naphthoxybutyric acid

As examples of the preferred azonaphthol dye starting materials, mention may be made of the following novel compounds which are also disclosed and claimed in the aforementioned copending application:

(13)

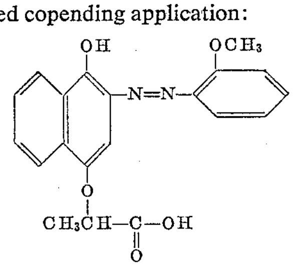

α-[3-(2′-methoxy)-phenylazo-4-hydroxy-1-naphthoxy]-propionic acid (14)

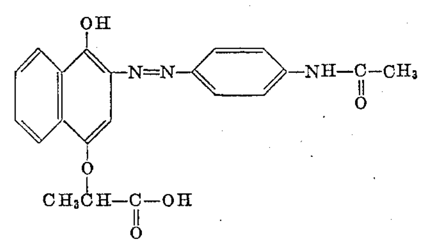

α-[3-(p-acetamido)-phenylazo-4-hydroxy-1-naphthoxy]-propionic acid (15)

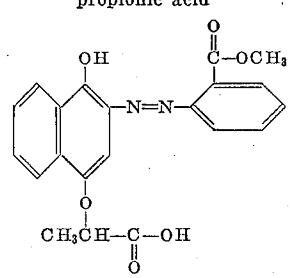

α-[3-(2′-carbomethoxy)-phenylazo-4-hydroxy-1-naphthoxy]-propionic acid (16)

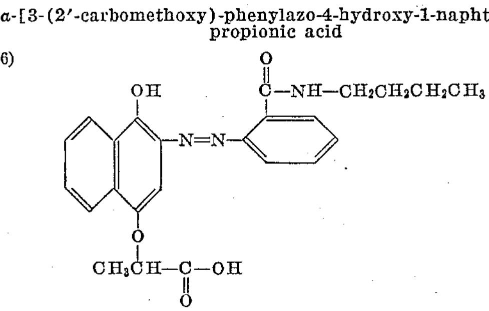

α-[3-(2′-[N-butyl]-carbamyl)-phenylazo-4-hydroxy-1-naphthoxy]-propionic acid

(17)
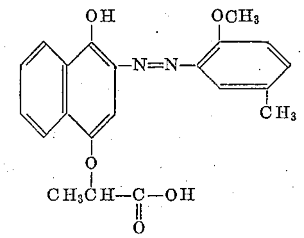

α-[3-(2′-methoxy-5′-methyl)-phenylazo-4-hydroxy-1-naphthoxy]-propionic acid

(18)
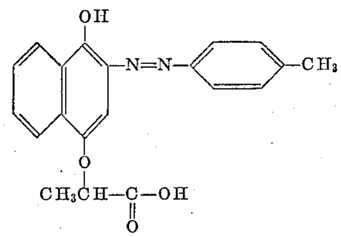

α-[3-(p-methyl)-phenylazo-4-hydroxy-1-naphthoxy]-propionic acid

(19)
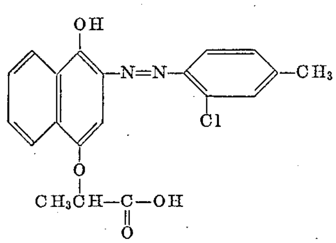

α-[3-(2′-chloro-4′-methyl)-phenylazo-4-hydroxy-1-naphthoxy]-propionic acid

(20)
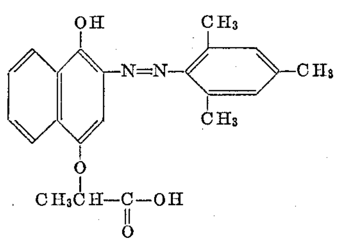

α-[3-(2′,4′,6′-trimethyl)-phenylazo-4-hydroxy-1-naphthoxy]-propionic acid

(21)
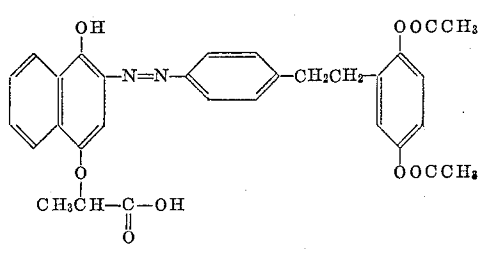

α-[3-p-(β-2′,5′-diacetoxyphenethyl)-phenylazo-4-hydroxy-1-naphthoxyl]-propionic acid

(22)
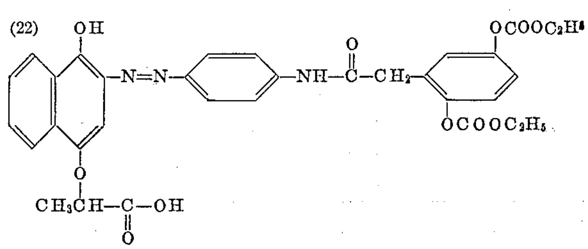

α-[3-(p-dicathyloxyhomogentisamido)-phenylazo-4-hydroxy-1-naphthoxy]-propionic acid

(23)
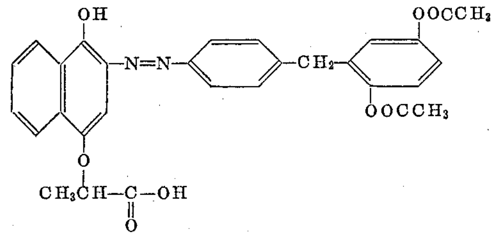

α-[3-(p-2′,5′-diacetoxyphenylmethyl)-phenylazo-4-hydroxy-1-naphthoxy]-propionic acid As examples of the preferred compounds of the present invention (as represented by Formula B) which may be prepared from the aforementioned novel compounds, mention may be made of the following:

(24)
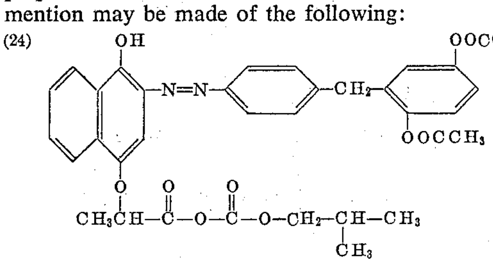

α-[3-(p-2′,5′-diacetoxyphenylmethyl)-phenylazo - 4 - hydroxy-1-naphthoxy]-propionic acid, mixed anhydride with isobutyl chlorocarbonate

(25)
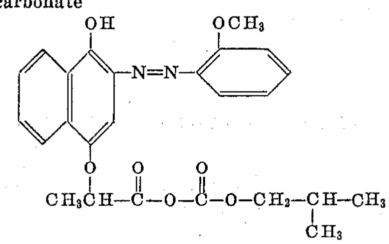

α-[3-(2′-methoxy) - phenylazo-4-hydroxy-1-naphthoxy]-propionic acid, mixed anhydride with isobutyl chlorocarbonate

(26)
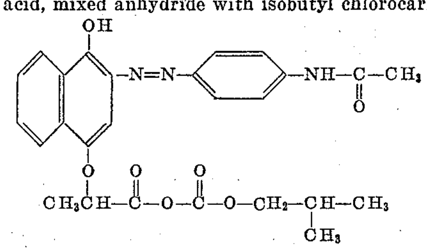

α-[3-(p-acetamido) - phenylazo-4-hydroxy-1-naphthoxy]-propionic acid, mixed anhydride with isobutyl chlorocarbonate

(27)
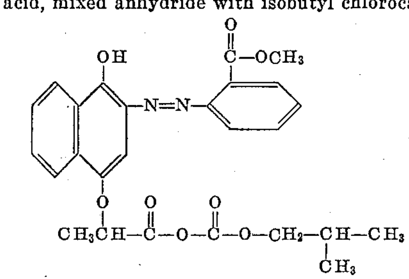

α-[3-(2′-carbomethoxy)-phenylazo-4-hydroxy - 1 - naphthoxy]-propionic acid, mixed anhydride with isobutyl chlorocarbonate

(28)
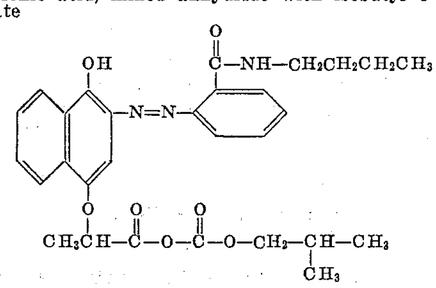

α-[3-(2′-[N-butyl]-carbamyl) - phenylazo-4-hydroxy-1-naphthoxy]-propionic acid, mixed anhydride with isobutyl chlorocarbonate (29)

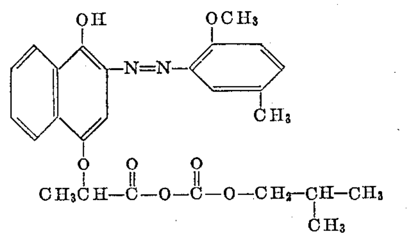

α-[3-(2′-methoxy-5′-methyl)-phenylazo - 4 - hydroxy-1-naphthoxy]-propionic acid, mixed anhydride with isobutyl chlorocarbonate (30)

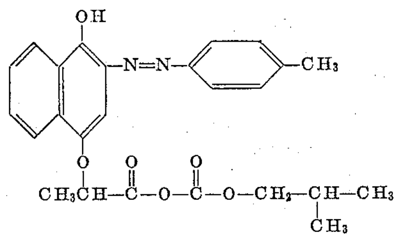

α-[3-(p-methyl)-phenylazo-4-hydroxy-1-naphthoxy]-propionic acid, mixed anhydride with isobutyl chlorocarbonate (31)

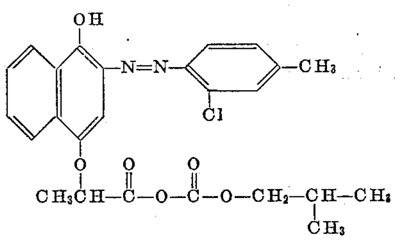

α-[3-(2′-chloro-4′-methyl) - phenylazo - 4 - hydroxy-1-naphthoxy]-propionic acid, mixed anhydride with isobutyl chlorocarbonate (32)

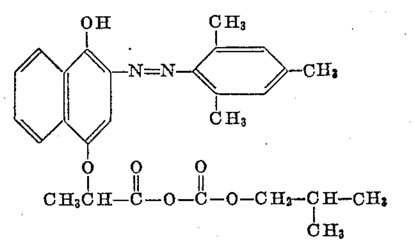

α-[3-(2′,4′,6′-trimethyl) - phenylazo-4-hydroxy-1-naphthoxy]-propionic acid, mixed anhydride with isobutyl chlorocarbonate (33)

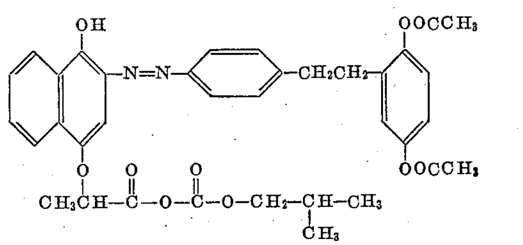

α-[3-p-(β-2′,5′-diacetoxyphenethyl)-phenylazo - 4 - hydroxy-1-naphthoxy]-propionic acid, mixed anhydride and isobutyl chlorocarbonate (34)

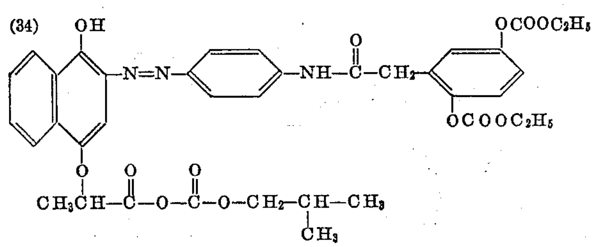

α-[3-(p-dicathyloxyhomogentisamido)-phenylazo - 4 - hydroxy-1-naphthoxy]-propionic acid, mixed anhydride with isobutyl chlorocarbonate It will be noticed that in compounds 24–34, the alkylene moiety is ethylidine and the alkyl moiety is isobutyl. While these compounds are the preferred intermediates, it will be appreciated that by appropriate substitution of the alkylene moiety (as illustrated for example in compounds 9–12) and/or by selection of other alkyl chlorocarbonates, e.g., methyl, ethyl, isopropyl chlorocarbonate, etc., the various homologues within the scope of Formula B may be readily synthesized.

The novel compounds of this invention are particularly useful in the preparation of the novel dye developers (compounds which are both dyes and silver halide developing agents) which are described and claimed in copending application Serial No. 262,358 filed concurrently. As is disclosed in said copending application, the compounds of this invention may be reacted with an amine containing a silver halide developing function, e.g., a p-dihydroxyphenyl radical or a protected derivative thereof to form the dye developer. The dye developers prepared from the novel compounds of this invention may be employed in photographic compositions, products and processes such as described and claimed in U.S. Patent No. 2,893,606 to prepare monochromatic or multicolor images.

The following examples show by way of illustration and not by way of limitation the preparation of the novel compounds of this invention:

EXAMPLE I

*α-(4-hydroxy)-1-naphthoxypropionic acid*

1,4-naphthoquinone (0.144 mole) and stannous chloride (0.144 mole, anhydrous) were dissolved at room temperature with stirring in 350 ml. of ethyl lactate. The solution was cooled to 5–10° C. and hydrogen chloride was bubbled through the solution at a brisk rate for six hours (the temperature of solution being held at 5–10° C.). The resultant clear reaction solution was poured into 750 ml. of a water-ice mixture. The oil which separated upon standing was separated by decantation of the water phase. The oily product was washed with a small volume of water then hydrolyzed. Nitrogen was bubbled through the water slurry for 1 hour with stirring. Nitrogen bubbling was continued while a solution of sodium hydroxide (.28 mole in 150 ml. of water which had been purged for 1 hour with $N_2$) was added over a 5 min. period with stirring (at room temperature). The resultant clear basic solution was stirred for an additional 15 minutes and then acidified (to a pH of 2) by the slow addition of 6 N hydrochloric acid (keeping a nitrogen atmosphere until the hydrolysis mixture was acidic). The precipitate was dissolved in sodium bicarbonate solution, the insoluble impurities removed by filtration, and the product was precipitated from the filtrate by acidification with dilute hydrochloric acid. The product obtained had M.P. 154–161° C. and was purified further by recrystallization from toluene to yield α-(4-hydroxy)-1-naphthoxypropionic acid, M.P. 157–159° C., having the following structural formula:

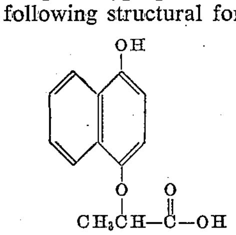

Elemental analysis of the product as $C_{13}H_{12}O_4$:

| | C | H |
|---|---|---|
| Found | 67.1 | 5.2 |
| Calculated | 67.2 | 5.19 |

EXAMPLE II p-(2,5-diacetoxyphenylmethyl) aniline hydrochloride (.015 mole) was diazotized with sodium nitrite. (.015 mole) and hydrochloric acid (.030 mole) in 50 ml. water at 0–5° C., and the slight excess of nitrous acid was decomposed with sulfamic acid. The diazonium solution (0–5°) was added over a 10 minute period to a solution (at 10°) of α-(4-hydroxy)-1-naphthoxypropionic acid (.015 mole) in an acetone-water mixture containing sodium bicarbonate (excess). The reaction mixture was acidified with dilute hydrochloric acid to dissolve the sodium salt of the dye-acid (which had separated during the coupling) and to preciptate the dye-acid, α-[3-p-(2′,5′-diacetoxyphenylmethyl)phenylazo-4 - hydroxy - 1-naphthoxy]-propionic acid. A solution of the dye-acid (.0083 mole) in dry acetone (minimum volume) was deaerated with nitrogen and treated with triethylamine (dry, .0083 mole). The acetone solution of the triethylammonium salt of the dye-acid was cooled to −5° C. and isobutyl chlorocarbonate (.0083 mole) was added. The reaction mixture was stirred at −5° C. (in a nitrogen atmosphere) for an additional 25 minutes to yield a solution of the mixed anhydride, compound 24.

EXAMPLE III o-Anisidine (.022 mole) was diazotized with sodium nitrite (.022 mole) and hydrochloric acid (.066 mole) in 50 ml. of water at 0 to 5° C. The cooled diazonium solution was slowly added (over a ten minute period) to a solution of .020 mole of α-(4-hydroxy)-1-naphthoxypropionic acid in an acetone-water mixture containing an excess of sodium bicarbonate. The sodium salt of the dye acid which had precipitated from the coupling mixture was converted to the dye acid upon acidification of the coupling mixture with dilute hydrochloric acid. The precipitated acid was recrystallized from methyl Cellosolve affording α-[3 - (o - methoxyphenylazo) - 4 - hydroxy - 1-naphthoxy]-propionic acid, M.P. 248–249°, in 90% yield. The purified and dried dye-acid (.0145 mole) was dissolved in dry chloroform (minimum volume) and triethylamine (dry, .0145 mole) was added. The chloroform solution of the triethylammonium salt of the dye-acid was deaerated by bubbling nitrogen through the solution and cooled to −2° C. Isobutyl chlorocarbonate (.0145 mole) was added with stirring and the reaction mixture held at −2° to 0° C. ($N_2$ atmosphere) for 25 minutes to yield a solution of the mixed anhydride, compound 25.

EXAMPLE IV

The mixed anhydride, compound 26, was prepared in a manner similar to that set forth in Example III by using p-acetamidoaniline in place of o-anisidine.

EXAMPLE V

The mixed anhydride, compound 27, was prepared in a manner similar to that set forth in Example III substituting methyl anthranilate in place of o-anisidine.

EXAMPLE VI

The mixed anhydride, compound 28, was prepared in a manner similar to that set forth in Example III. In lieu of using o-anisidine, methyl anthranilate was diazotized and coupled with α-(4-hydroxylnaphthoxy) propionic acid. The resulting dye, α-(3-o-carbomethoxyphenylazo-4-hydroxy-1-naphthoxy) propionic acid, was then reacted with n-butylamine and the mixed anhydride of the resulting product was formed in the manner illustrated in Example III.

EXAMPLE VII

The mixed anhydride, compound 29, was prepared in a manner similar to that set forth in Example III substituting 2-methoxy-5-methyl aniline for o-anisidine.

EXAMPLE VIII

The mixed anhydride, compound 30, was prepared in a manner similar to that set forth in Example III using p-toluidine in place of o-anisidine.

EXAMPLE IX

The mixed anhydride, compound 31, was prepared in a manner similar to that set forth in Example III substituting 2-chloro-4-methyl aniline for o-anisidine.

EXAMPLE X

The mixed anhydride, compound 32, was prepared in a manner similar to that set forth in Example III substituting o-mesidine for o-anisidine.

EXAMPLE XI

The mixed anhydride, compound 33, was prepared in a manner similar to that set forth in Example II substituting p-(β-2,5-diacetoxyphenethyl) aniline hydrochloride for p-(2,5-diacetoxyphenylmethyl) aniline hydrochloride.

EXAMPLE XII

The mixed anhydride, compound 34, was prepared in a manner similar to that set forth in Example II substituting dicathyloxyhomogentisamido aniline for p-(2,5-diacetoxyphenylmethyl) aniline hydrochloride.

The compounds prepared in Examples II–XII were not isolated. Instead, the reaction mixtures containing the novel compounds of this invention were used directly in the preparation of the novel dye developer described and claimed in the aforementioned copending application Serial No. 262,358. However, it is clear from the reactants used and from the chemical behavior of the resulting products in the synthesis of the respective dye developers that the products obtained in Examples II–XII were mixed anhydrides having the structural formulae heretofore noted.

As was noted heretofore, the novel compounds of this invention are obtainable only at reduced temperatures, e.g., at temperatures on the order of −5° C. It has been found that even at these temperatures, the compounds are stable only for a relatively short periods of time, say, for example, 25–30 minutes. Accordingly, these compounds must be maintained at the reduced temperatures employed in their synthesis (or at lower temperatures) and used reasonably promptly.

The following example illustrates the use of the compounds of this invention in the synthesis of a novel class of dye developers.

EXAMPLE XIII

An acetone solution (deaerated and chilled) of p-(β-2,5-diacetoxyphenethyl) aniline (.0083 mole) (which had been generated in solution from the hydrochloride by addition of triethylamine) was added with stirring over a 15 minute period to the acetone solution of the mixed anhydride prepared in Example II, maintaining the temperature of the reaction mixture at −5° C. The cooling bath was removed and the reaction mixture was stirred overnight. The reaction mixture was filtered to remove some triethylamine hydrochloride, the precipitate washed with acetone and the filtrate and washings concentrated to dryness in vacuo. The glassy residue was washed with water and dilute acid. The solid was dissolved in methyl Cellosolve (minimum volume) and the solution was purged with nitrogen and cooled to 0° C. An oxygen-free aqueous solution of sodium hydroxide (.050 mole) was added and the solution stirred for 1 hour at 0° C. maintaining a nitrogen atmosphere. The solution was acidified with dilute hydrochloric acid and the precipitate was recrystallized from a mixture of acetone and benzene yielding 4-α-[p-(β-2′,5′-dihydroxyphenethyl)-phenylcarbamyl] - ethoxy - 2 - [p-(2″,5″-dihydroxyphenylmethyl)-phenylazo]-1-naphthol, M.P. 194–199° C., max. of 522 mμ in methyl Cellosolve.

Corresponding dye developers were synthesized in a manner similar to that set forth in Example XIII by using the mixed anhydrides prepared in Examples III–XII. In each instance, the dye developer synthesized and the chemical properties of the reactants confirm the formation of the corresponding mixed anhydrides as illustrated by the structural formulae. As was indicated heretofore, the dye developers prepared from the novel compounds of this invention (as illustrated by Example XIII) are disclosed and claimed in copending application Serial No. 262,358.

Since certain changes may be made in the above product and process without departing from the scope of the invention herein involved, it is intended that all matter contained in the above description shall be interpreted as illustrative and not in a limiting sense.

What is claimed is:

1. Mixed anhydrides of the formula:

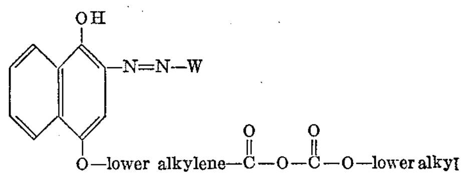

wherein W is the radical of a diazotizable amine of the benzene series.

2.

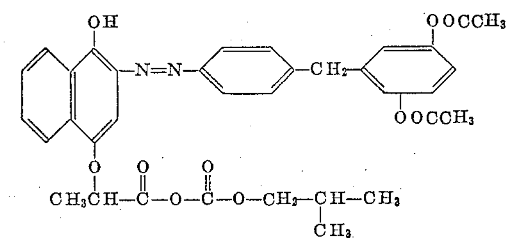

3.

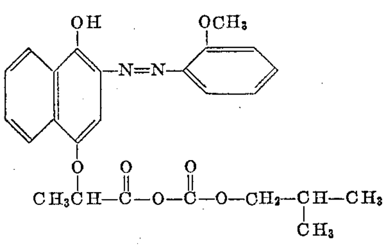

4.

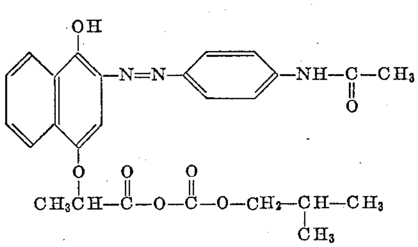

5.

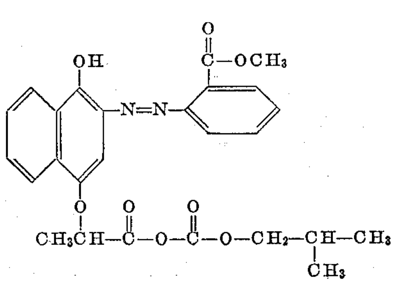

6.

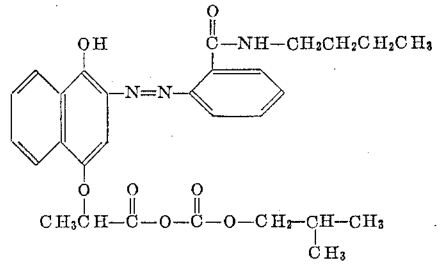

7.

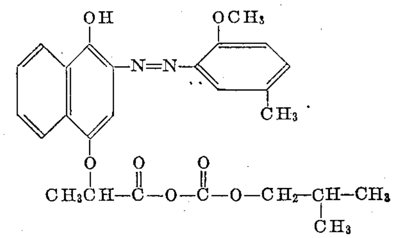

8.

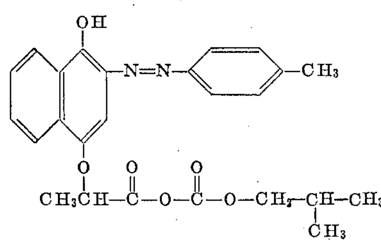

9.

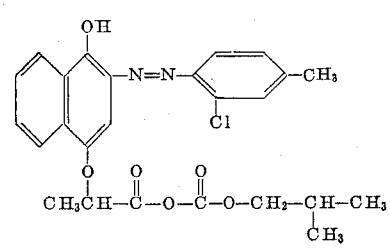

10.

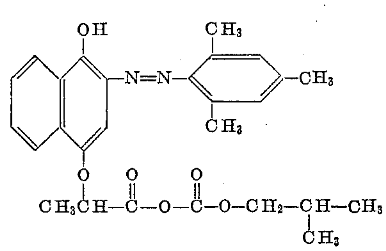

11.

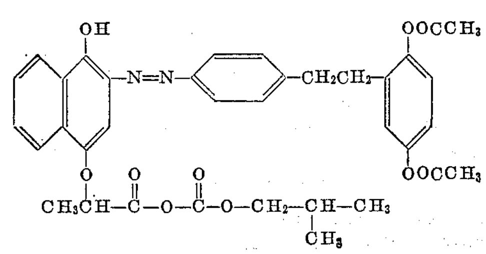

12.
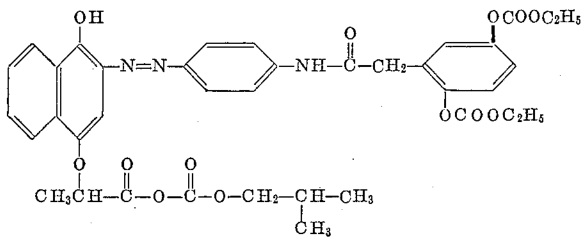
References Cited by the Examiner
FOREIGN PATENTS
117,267 1/1901 Germany.
OTHER REFERENCES
Adkins et al.: Jour. Am. Chem. Soc., vol. 71 (1949), pp. 2242–2244.
CHARLES B. PARKER, *Primary Examiner.*
NORMA S. MILESTONE, DONALD M. PAPUGA, *Assistant Examiners.*